United States Patent
Chen

(10) Patent No.: US 11,010,611 B2
(45) Date of Patent: May 18, 2021

(54) VR CONTENT SHOOTING METHOD, RELATED DEVICE AND SYSTEM

(71) Applicant: Tencent Technology (Shenzhen) Company Limited, Shenzhen (CN)

(72) Inventor: Yang Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 56 days.

(21) Appl. No.: 16/543,307

(22) Filed: Aug. 16, 2019

(65) Prior Publication Data
US 2019/0370550 A1    Dec. 5, 2019

Related U.S. Application Data

(63) Continuation of application No. PCT/CN2018/100356, filed on Aug. 14, 2018.

(30) Foreign Application Priority Data

Aug. 17, 2017    (CN) .......................... 201710710067.8

(51) Int. Cl.
*G06K 9/00*    (2006.01)
*G06T 7/70*    (2017.01)
(Continued)

(52) U.S. Cl.
CPC .......... *G06K 9/00671* (2013.01); *G06F 3/011* (2013.01); *G06T 7/70* (2017.01);
(Continued)

(58) Field of Classification Search
CPC ........ G06F 3/012; G06F 3/0346; G06F 3/011; G06K 9/00671; G06K 9/209;
(Continued)

(56) References Cited

U.S. PATENT DOCUMENTS

| | | | | |
|---|---|---|---|---|
| 8,885,049 B2* | 11/2014 | Miksch | ................ | H04N 17/002 348/175 |
| 2006/0258938 A1* | 11/2006 | Hoffman | ................ | A61B 5/061 600/424 |
| 2009/0058990 A1* | 3/2009 | Kim | ........................ | G03B 37/02 348/36 |
| 2009/0131167 A1* | 5/2009 | Kawabata | ........... | A63F 13/5255 463/32 |

(Continued)

FOREIGN PATENT DOCUMENTS

| CN | 105894566 A | 8/2016 |
|---|---|---|
| CN | 107517372 A | 12/2017 |

OTHER PUBLICATIONS

Tencent Technology, WO, PCT/CN2018/100356, Nov. 5, 2018, 5 pgs.
Tencent Technology, IPRP, PCT/CN2018/100356, Feb. 18, 2020, 6 pgs.

*Primary Examiner* — Jennifer Mehmood
*Assistant Examiner* — Kim Thanh T Tran
(74) *Attorney, Agent, or Firm* — Morgan, Lewis & Bockius LLP

(57) ABSTRACT

Embodiments of this application disclose a method for photographing VR content by a computing device. The method includes: obtaining first position and first rotation of a VR display device; obtaining a photographing parameter including a distance between a virtual camera and a target object displayed in the display device; calculating second position of the camera according to the first position and the photographing parameter, and second rotation of the camera according to the first rotation; calculating a real-time direction of the camera according to the second position and the second rotation; and recording, according to the real-time direction of the camera, image information including the target object photographed by the camera. The embodiments of this application further provide a computing device for providing a universal photographing manner in VR applications, and the photographing manner is not limited to photographing functions of the VR applications.

20 Claims, 12 Drawing Sheets

(51) Int. Cl.
*H04N 13/279* (2018.01)
*G06F 3/01* (2006.01)
*G06T 19/00* (2011.01)
*H04N 5/262* (2006.01)

(52) U.S. Cl.
CPC ......... *G06T 19/006* (2013.01); *H04N 5/2621* (2013.01); *H04N 13/279* (2018.05)

(58) Field of Classification Search
CPC ......... G06T 19/006; G06T 2207/30244; G06T 7/70; G06T 2207/30201; H04N 13/117; H04N 13/279; H04N 13/344; H04N 5/2621; H04N 13/275; H04N 13/296
USPC .......................................................... 345/633
See application file for complete search history.

(56) References Cited

U.S. PATENT DOCUMENTS

| | | | |
|---|---|---|---|
| 2011/0136571 A1* | 6/2011 | Ito | A63F 13/52 |
| | | | 463/30 |
| 2012/0075428 A1* | 3/2012 | Seki | H04N 13/106 |
| | | | 348/47 |
| 2013/0007668 A1* | 1/2013 | Liu | G06F 3/0482 |
| | | | 715/841 |
| 2013/0179073 A1* | 7/2013 | Stritzel | G01S 3/7867 |
| | | | 701/513 |
| 2017/0024935 A1* | 1/2017 | Baba | G06F 3/0383 |
| 2018/0293756 A1* | 10/2018 | Liu | G06N 3/04 |
| 2018/0311579 A1* | 11/2018 | Matsui | A63F 13/06 |
| 2019/0118386 A1* | 4/2019 | Okumura | B25J 9/1689 |

* cited by examiner

VR CONTENT SHOOTING METHOD, RELATED DEVICE AND SYSTEM

CROSS-REFERENCE TO RELATED APPLICATIONS

This application is a continuation application of PCT/CN2018/100356, entitled "METHOD FOR PHOTOGRAPHING VR CONTENT, PROCESSING DEVICE, SYSTEM, AND STORAGE MEDIUM" filed on Aug. 14, 2018, which claims priority to Chinese Patent Application No. 201710710067.8, entitled "METHOD FOR PHOTOGRAPHING VR CONTENT, RELATED DEVICE, AND SYSTEM" filed with the National Intellectual Property Administration, PRC on Aug. 17, 2017, all of which are incorporated by reference in its their entirety.

FIELD OF THE TECHNOLOGY

The present disclosure relates to the field of computers, and particularly, to a method for photographing virtual reality (VR) content, a computing device, a system, and a storage medium.

BACKGROUND OF THE DISCLOSURE

A VR technology is a computer simulation technology that can create and experience a virtual world. On the computer, the VR technology can be used to generate a simulated environment. The simulated environment is obtained by performing system simulation on interactive three-dimensional dynamic views and entity behaviors fused by information from a plurality of sources, so that a user can be immersed in the simulated environment.

The VR market is growing rapidly, and the number of users is increasing. The demand for VR applications that can take selfie and share content of the selfie is also gradually increasing. The VR applications designed to meet the selfie needs of VR users arise at the historic moment. In the existing technology, during development of a VR application, a selfie function is built in the application. A most common VR application development tool Unity is used as an example. When a user uses a selfie function, the VR application needs to create a Unity assembly camera, to render a selfie scene to implement selfie.

Whether the VR application can achieve a selfie effect depends on whether a selfie function is built in the VR application during development of the VR application by a developer of the VR application. If the selfie function is not built in the VR application, the selfie effect cannot be achieved. Based on the above, a method that is used for implementing photographing and that is not limited to functions of the VR application is required urgently.

SUMMARY

The embodiments of this application provide a method for photographing VR content, a computing device, a system, and a storage medium, for providing a content photographing method that is not limited to functions of VR applications but is universal in the VR applications.

According to a first aspect, an embodiment of this application provides a method for photographing VR content, applied to a virtual reality system, the VR system including a computing device and a VR display device, the VR display device being connected to the computing device, and the method including:

obtaining, by the computing device, first position information and first rotation information of the VR display device;

obtaining, by the computing device, a photographing parameter, the photographing parameter including a distance between a virtual camera and a target object displayed in the display device, the virtual camera being a created virtual controller;

calculating, by the computing device, second position information of the virtual camera according to the first position information and the photographing parameter;

calculating, by the computing device, second rotation information of the virtual camera according to the first rotation information;

calculating, by the computing device, a real-time direction of the virtual camera according to the second position information and the second rotation information; and recording, by the computing device according to the real-time direction of the virtual camera, image information including the target object photographed by the virtual camera.

According to a second aspect, an embodiment of this application provides a computing device comprising one or more processors, memory coupled to the one or more processors and a plurality of programs stored in the memory for photographing VR content, applied to a virtual reality (VR) system comprising a VR display device, and wherein the plurality of programs, when executed by the one or more processors, cause the computing device to perform the aforementioned method for photographing VR content.

According to a third aspect, an embodiment of this application provides a non-transitory computer readable storage medium storing a plurality of machine readable instructions for photographing VR content in connection with a virtual reality (VR) system comprising a VR display device and a computing device having one or more processors, memory coupled to the one or more processors and a plurality of programs stored in the memory that, when executed by the one or more processors, cause the computing device to perform the aforementioned method for photographing VR content.

According to the foregoing technical solutions, it can be learned that the embodiments of this application have the following advantages:

In the embodiments of this application, the computing device creates the virtual controller; the virtual controller may execute the function of the virtual camera; the computing device obtains the first position information and the first rotation information of the display device; then the computing device may calculate the second position information of the virtual camera according to the first position information and the photographing parameter; the computing device calculates the second rotation information of the virtual camera according to the first rotation information; after the second position information and the second rotation information are determined, the real-time direction of the virtual camera may be further determined, and the image information photographed by the virtual camera is recorded according to the real-time direction of the virtual camera. In the embodiments of this application, the second position information and the second rotation information of the virtual camera are calculated according to the first position information, the first rotation information and the photographing parameter of the display device that are obtained in real time, and the real-time direction of the virtual camera is determined, to record photographed information. The method provided in the embodiments may make up for a photographing function loss for a VR application without a photographing function, and the method may also be used as a functional supplement for a VR application with a selfie function, and provides a photographing manner that does not affect normal use of a VR application by a user.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled the art may still derive other drawings from these accompanying drawings.

DESCRIPTION OF EMBODIMENTS

Figure 1:
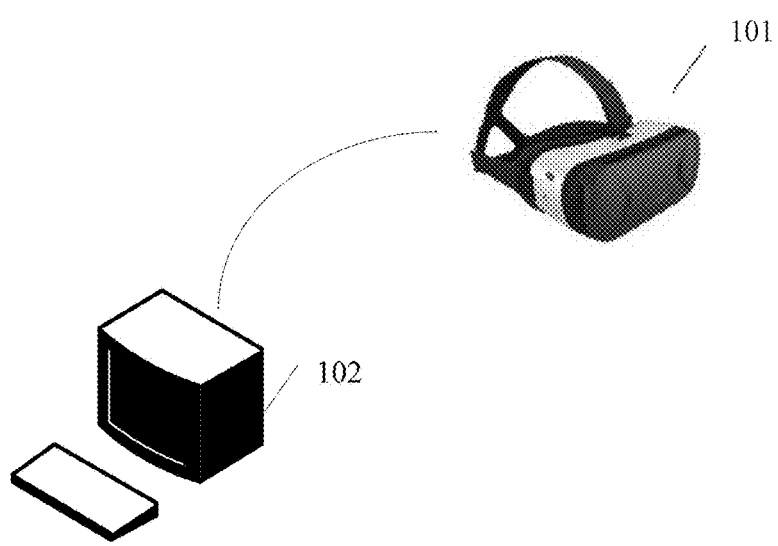
FIG. 1 is a schematic diagram of a VR system in an embodiment of this application.

The embodiments of this application provide a method for implementing photographing in VR, for providing a universal photographing manner in VR applications.

To make a person skilled in the art better understand solutions of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

In the specification, claims, and accompanying drawings of this application, the terms "first", "second", "third", "fourth", and so on (if exists) are intended to distinguish similar objects but do not necessarily indicate a specific order or sequence. It should be understood that such used data can be exchanged with each other in appropriate cases, so that the embodiments described herein can be implemented in a sequence other than the sequences shown in the figures or content described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may optionally further include other steps or units not expressly listed or inherent to such a process, method, product, or device.

In real life, selfie has become a popular behavior, and based on the powerful needs of selfie, camera phones, camera applications, small video applications, and live applications emerge in an endless stream, and content selfie has become the mainstream. Based on the feeling brought by selfie in the real world, a growing number of VR applications also provide selfie functions in VR. For example, some VR social software directly integrates the selfie function. The selfie function in VR in the existing technology is limited to the application layer, that is, depends on whether the application has a built-in selfie function in the application development process, and only if the selfie function is built in the application development process, the selfie effect can be achieved. In addition, in the existing technology, a handheld controller needs to be occupied during selfie in VR to serve as a selfie stick, and selfie will interrupt or suspend an original process of the VR application.

Based on the deficiency in the existing technology that selfie can be performed only when a photographing function is built in a VR application, an embodiment of this application provides a photographing method universal in VR applications, and the method can make up for a function loss for a VR application without a selfie function, to achieve photographing and recording effects, and can also be used as a functional supplement for a VR application with a selfie function, to provide a selfie manner that does not affect normal use of the VR application by a user.

The method for photographing VR content according to this embodiment of this application is applied to a VR system. Refer to FIG. 1 for understanding. FIG. 1 is a schematic diagram of the VR system. The VR system includes a VR display device 101 and a computing device 102. The VR display device 101 is connected to the computing device 102. The VR display device 101 is a VR head-mounted display device. For example, the VR display device may be VR glasses, a VR helmet, or the like. The VR display device 101 is a device that closes vision and hearing of people to the outside by using a head-mounted display, to guide a user to generate a feeling of being located in a virtual environment. The computing device 102 may be a computer, a mobile phone, a palmtop computer, or the like.

In this embodiment of this application, one virtual controller is created through a driver interface of a VR technology platform, and the virtual controller represents one camera in a VR application. For example, in an application scenario, a technology developer may perform a downloading operation on a computer, so that the computer can download a software development kit (SDK) from a steam VR platform. The SDK includes an OpenVR driver interface. The computer creates a virtual controller by using the OpenVR driver interface used by the steam VR platform, so that a location and a photographing direction of the virtual camera in VR can be adjusted by controlling a direction of the virtual controller. The virtual controller is equivalent to a virtual camera. The virtual camera in this embodiment may also be briefly referred to as a camera.

Specifically, in this embodiment of this application, the VR display device 101 determines first position information and first rotation information of the VR display device 101 in VR through a positioning apparatus and a sensing apparatus of the VR display device 101. The VR display device 101 sends the first position information and the first rotation information to the computing device 102. The computing device 102 obtains the first position information and the first rotation information. The computing device 102 obtains a photographing parameter. The photographing parameter includes a distance between the camera and a target object displayed in the display device. The photographing parameter may be input by a user, or may be preset in the computing device 102. A specific manner of obtaining the photographing parameter is not limited. Then, the computing device 102 may calculate second position information of the camera according to the first position information and the photographing parameter. The computing device 102 calculates second rotation information of the camera according to the first rotation information. The computing device 102 calculates a real-time direction of the camera according to the second position information and the second rotation information. It may be understood that when the real-time direction of the camera is determined, a real-time photographing viewing angle of the camera is also determined. The computing device 102 records, according to the real-time direction of the camera, image information photographed by the camera.

To facilitate understanding, terms involved in the embodiments of this application are first understood.

Euler angle: an indication manner of rotation, consisting of three angle parameters in a three-dimensional space. Any rotation can be expressed as a combination of three angles of rotation in sequence around three rotation axes. The three angles are referred to as Euler angles. The three rotation axes may refer to axes of the fixed world coordinate system, or refer to coordinate axes of an object coordinate system of a rotated object.

Rotation matrix: an indication manner of rotation, consisting of a 3*3 matrix in a three-dimensional space. The rotation matrix is a matrix that changes the direction of a vector but does not change the size of the vector when multiplied by the vector. That is, the rotation matrix is multiplied by a vector, and the direction of the vector can be changed, but the size of the vector is not changed.

Quaternion: an indication manner of rotation, consisting of one real number and three imaginary number parameters in a three-dimensional space. The quaternion may indicate rotation in a four-dimensional space. For example, one quaternion may be represented as x=a+bi+cj+dk, where a, b, c, and d are real numbers, and i, j, and k are imaginary number units.

Virtual controller: the OpenVR interface includes a driver interface specification. Through the OpenVR interface, a virtual controller similar to a physical handheld controller can be virtualized. In this embodiment of this application, the virtual controller represents a camera. Namely, the direction of the camera is controlled by controlling the direction of the virtual controller.

World coordinate system: the absolute coordinate system of the system; positions of coordinates of all points on the image before the user coordinate system is established are all determined according to the origin of the world coordinate system, and the world coordinate system is a global and constant reference coordinate system.

Target coordinate system: a local coordinate system during initialization of the camera, a local coordinate system limited to the camera. Upon test, during initialization of the camera, an actual value of the position of the origin of the target coordinate system in the world coordinate system is $P_{ci}$, =(−2.05, 1.87, −0.87). During initialization, rotation of the camera relative to the world coordinate system is $E_{ci}$=(0, −1.82, 0). $P_{ci}$ and $E_{ci}$ may be different in different configuration environments, and then $P_{ci}$ and $E_{ci}$ may be obtained after the camera is added and before the camera is moved.

Figure 2:
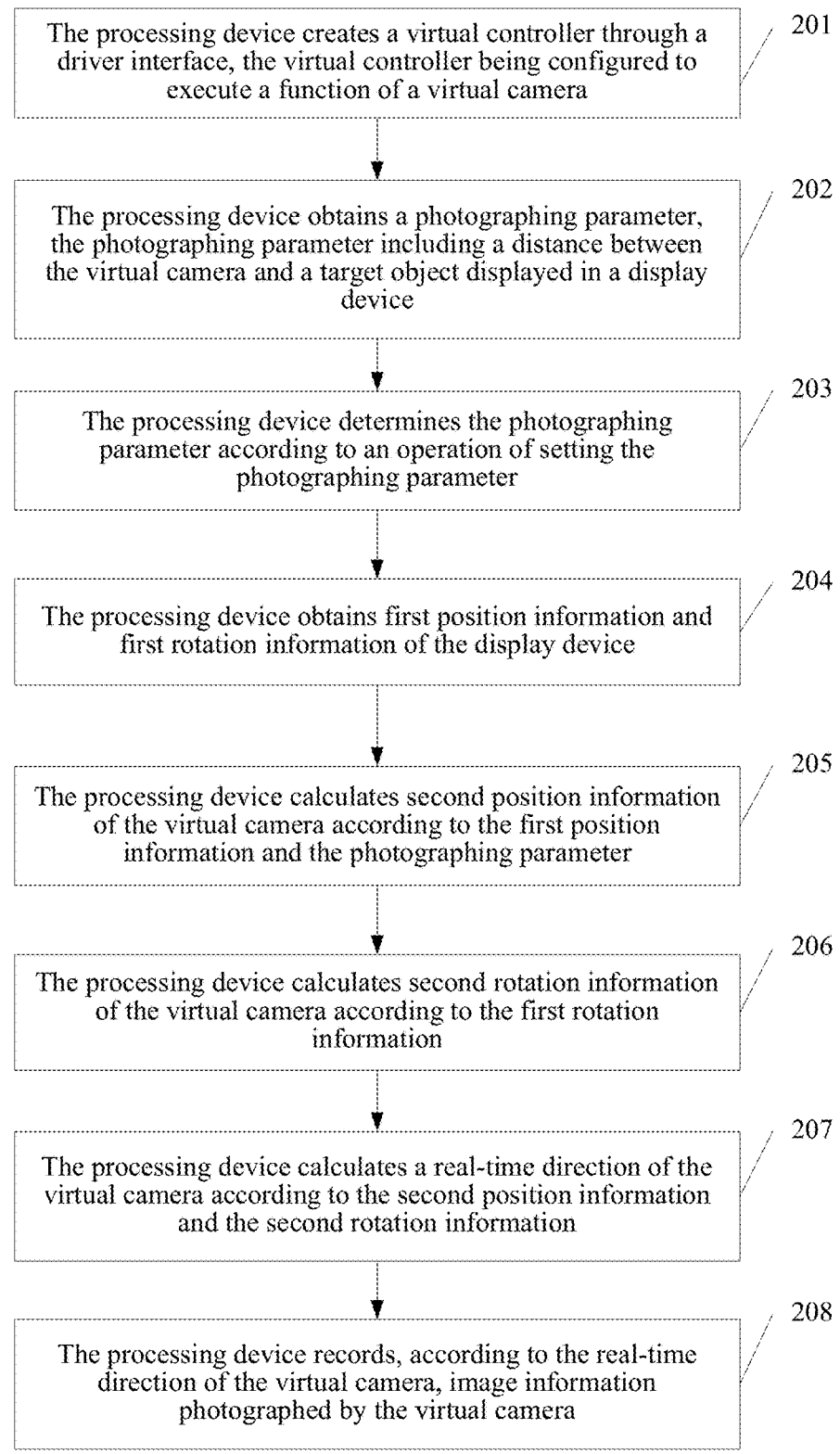
FIG. 2 is a schematic diagram of steps of a method for implementing photographing in VR in an embodiment of this application.

The following specifically describes a method for photographing VR content according to an embodiment of this application with reference to FIG. 2. In this embodiment of this application, description is made by using a computing device as an execution body.

Step 201: The computing device creates a camera through a driver interface.

In an embodiment of this application, the computing device downloads an SDK from a steam VR platform. The SDK includes an OpenVR driver interface. The computing device creates a virtual controller by using the OpenVR driver interface used by the steam VR platform, and may obtain, within a VR application through a mechanism of the Steam VR platform, a camera whose direction can be controlled. By controlling the direction of the virtual controller, the direction of the camera can be controlled. Therefore, in this embodiment of this application, the virtual controller may be equivalent to the camera. The camera is configured to photograph image information in VR. For example, the camera may perform photographing or recording.

It should be noted that this step is an optional step, and after the computing device creates the camera, this step may also be omitted.

Step 202: The computing device obtains a photographing parameter.

The photographing parameter may not only include a distance between the virtual camera and a target object displayed in the display device, but also include photographing distance information and photographing angle information.

Figure 3:
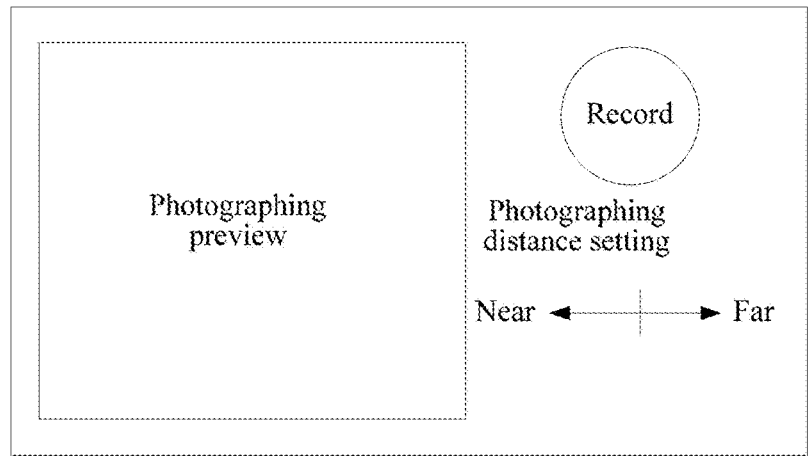
FIG. 3 is a schematic diagram of an interface for setting a photographing parameter that is displayed in a computing device in an embodiment of this application.

In this embodiment of this application, understanding is performed with reference to FIG. 3. FIG. 3 is a schematic diagram of an interface for setting a photographing parameter that is displayed in a computing device. The computing device may receive a photographing distance parameter input by a user, and before a record button is clicked, a photographing effect may be previewed in a preview window, to adjust an optimal photographing distance in a VR application.

To be specific, the computing device may receive the photographing distance parameter input by the user, and may also display the photographing effect in the preview window before the record button is clicked, so that the user can preview the photographing effect in the preview window before the record button is clicked, and the user can adjust the photographing distance in the VR application according to the previewed photographing effect, thereby obtaining the optimal photographing distance.

It should be noted that photographing in this embodiment of this application may be photographing for any angle of the target object displayed in the display device. The target object is a virtual role of the user in a virtual world. For example, in a VR game application, the virtual role of a player in VR is a racer, and the target object is a racer in the virtual world.

Figure 4:
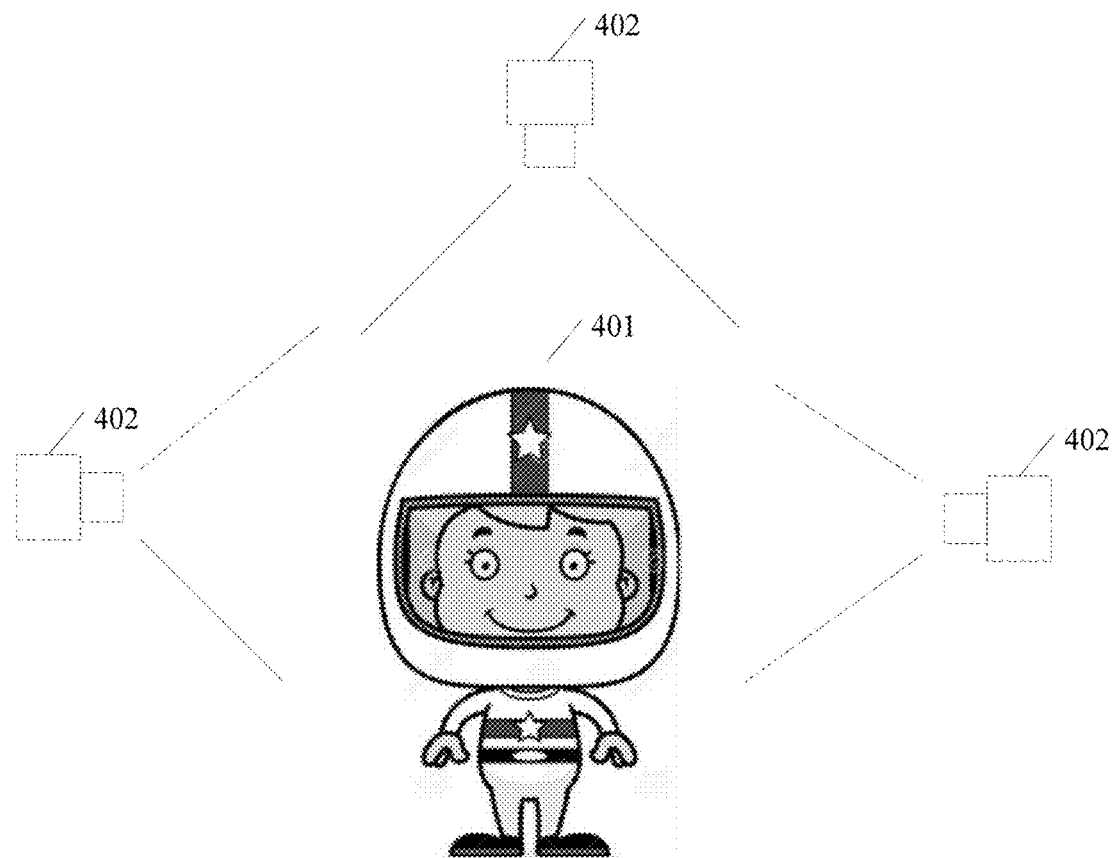
FIG. 4 is a schematic diagram of a scene in which a camera photographs a target object in an embodiment of this application.

In this embodiment of this application, understanding is performed with reference to FIG. 4. FIG. 4 is a schematic diagram of a scene in which a camera photographs a target object. For photographing angle information, a photographing angle of a camera 402 for a target object 401 may be a selfie angle of the target object 401. To be specific, the camera 402 is directly in front of the target object, or the camera 402 may be directly above the target object 401, or the camera 402 may be on the left side or the right side of the target object 401. Specifically, the photographing angle of the camera 402 may be preset. In this embodiment of this application, description may be made by using a selfie scene as an example. Namely, the camera performs photographing directly in front of the target object. It should be noted that, in an application scenario, the display device may display the camera, or may not display the camera.

Figure 5:
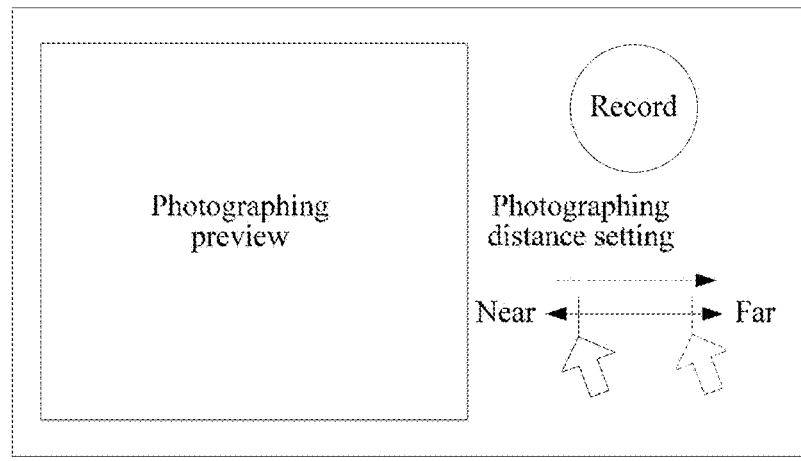
FIG. 5 is a schematic diagram of a scene in which a photographing distance is set in an embodiment of this application.
Figure 6:
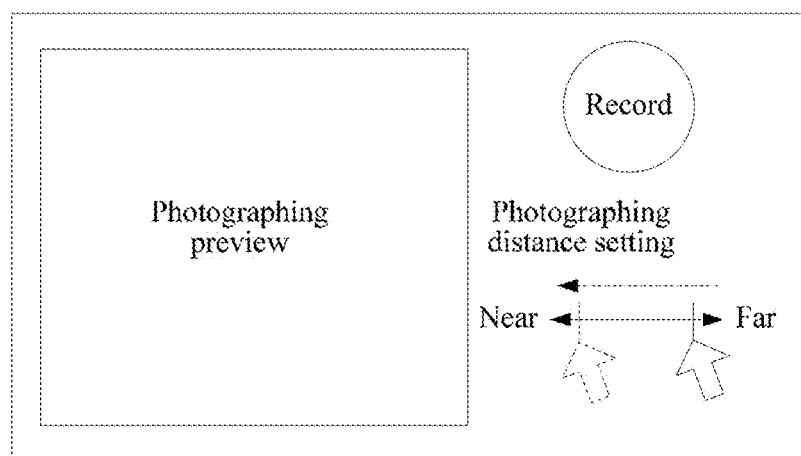
FIG. 6 is a schematic diagram of a scene in which a photographing distance is set in an embodiment of this application.

A manner of obtaining photographing distance information may be:

In a first possible implementation, the photographing distance information is distance information input by a user. Understanding is performed with reference to FIG. 5 and FIG. 6. FIG. 5 and FIG. 6 are schematic diagrams of a scene in which a photographing distance is set. A user may select the distance through an input device. For example, a shortest distance is "0", and a longest distance is "5". The user may slide, through a mouse, a confirmation point displayed on a screen of the computing device, to adjust the photographing distance. The distance may increase starting from 0 until a maximum preset value (for example, 5). The distance may also decrease from a value (for example, 5) until a suitable distance (for example, 3). In an application scenario, the camera is located directly in front of the target object and photographs the target object at a position with a distance "3" from the target object.

Figure 7:
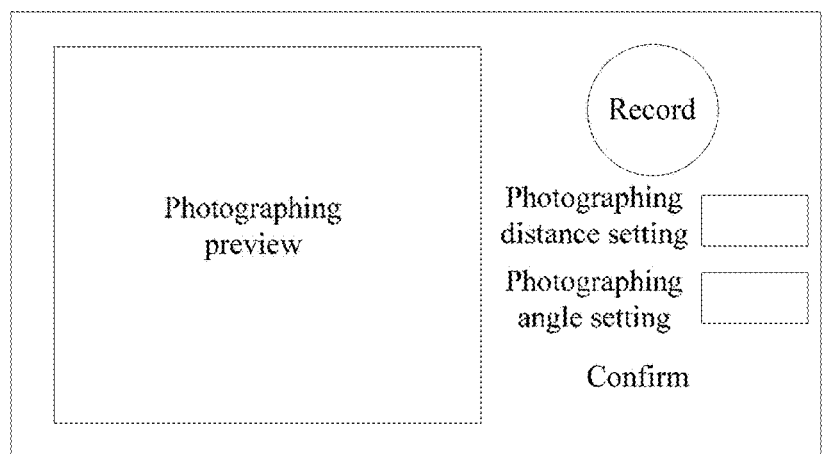
FIG. 7 is a schematic diagram of a scene in which a photographing parameter is set in an embodiment of this application.
Figure 8:
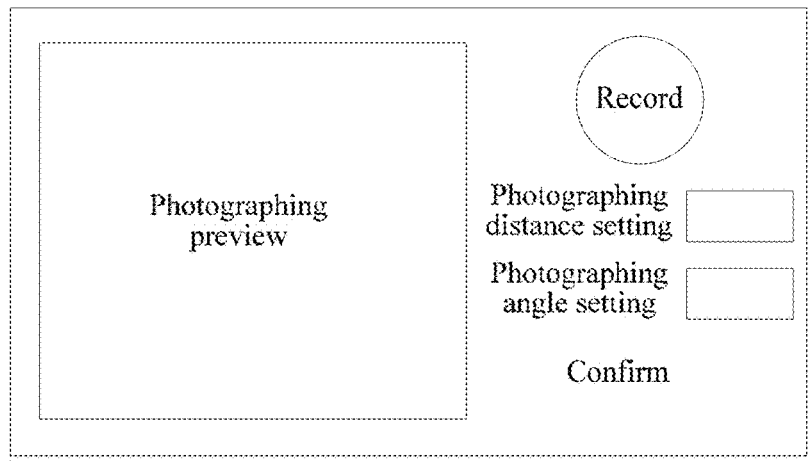
FIG. 8 is a schematic diagram of a scene in which a photographing angle is set in an embodiment of this application.

In a second possible implementation, the photographing distance information and the photographing angle information are specific values input by the user. Understanding is performed with reference to FIG. 7. FIG. 7 is a schematic diagram of a scene in which a photographing parameter is set. For example, if a default photographing angle is directly facing the target object, namely, the camera is located directly in front of the target object, if the photographing angle set by the user is 45 degrees, the distance between the camera and the target object is "3", and the height of the camera is the same as the height of the target object. To facilitate understanding, understanding is performed with reference to FIG. 8. FIG. 8 is a schematic diagram in which a photographing angle is set. In a target coordinate system, a coordinate of a point A of eyes of the target object is (0, 1, 0). If the photographing angle input by the user is 0 degree, the camera performs photographing directly facing the target object, and a coordinate of a point B of the position of the camera is (0, 1, 1). If the photographing angle input by the user is 90 degrees, the camera rotates in an anticlockwise manner around the y axis from the point B, and rotates to a position C. A coordinate of the point C of the position of the camera is (1, 1, 0). It should be noted that the coordinate of the point A, the coordinate of the point B, and the coordinate of the point C are all simple examples listed to facilitate understanding of the setting of the photographing angle, and do not constitute a limitative description of this application. Certainly, the user may also flexibly input another angle. The computing device may calculate the position of the camera in a form of an Euler angle. For example, the camera rotates around the x axis by a degrees, and then rotates around the y axis by b degrees, and rotates around the z axis by c degrees. The computing device determines, according to the angle specifically input by the user, the sequence of rotating around the x, y, and z axes.

Figure 9:
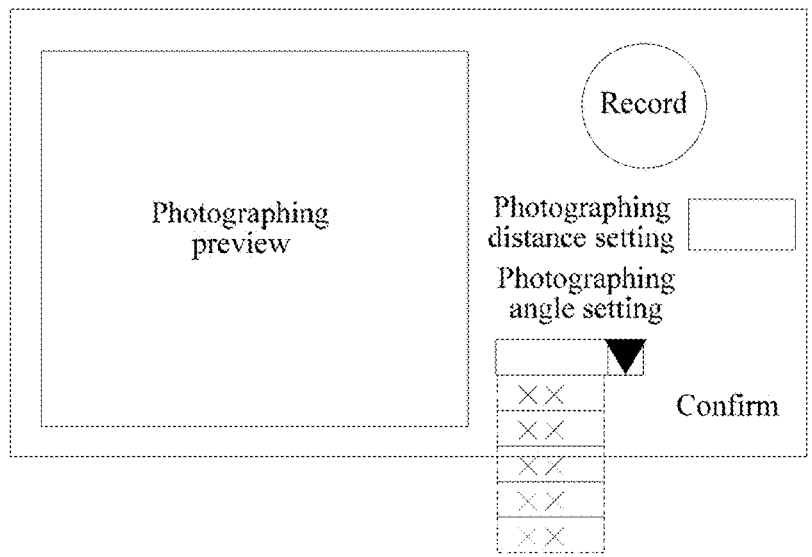
FIG. 9 is a schematic diagram of a scene in which a photographing angle is set in an embodiment of this application.

In a third possible implementation, understanding is performed with reference to FIG. 9. FIG. 9 is a schematic diagram of a scene in which a photographing angle is set. A plurality of photographing angles is preset. The plurality of preset photographing angles is photographing angles usually used by the user. The photographing angles usually used by the user may be obtained by collecting a large number of historical photographing angles set by the user. The user may select a target photographing angle in a selection menu. The target photographing angle is a photographing angle for photographing the target object. It should be noted that the plurality of preset photographing angles may be included in the selection menu, and the user may select one of the plurality of photographing angles included in the selection menu as a target photographing angle.

It should be noted that in the second possible implementation and the third possible implementation, after receiving the photographing angle input by the user, the computing device may calculate a position of the camera based on the photographing angle, and may also display the photographing angle through photographing preview, so that the user confirms whether the input photographing angle is the photographing angle desired by the user. After confirming the photographing parameter (including the photographing distance and the photographing angle), the user clicks the "OK" key displayed on the computing device, to complete setting of the photographing parameter.

Namely, the computing device may calculate the position of the camera according to the photographing angle input by the user, to display, in photographing preview, the target object when the camera performs photographing at the position, so that the user can see, in the photographing preview, a photographing effect in a current photographing angle, and determine whether the current photographing angle is the photographing angle desired by the user. If yes, the user may click the "OK" key, so that the user confirms that the setting work of the photographing parameter is completed.

Step 203: The computing device determines the photographing parameter according to an operation of setting the photographing parameter, the photographing parameter including a distance between the camera and a target object displayed in a display device.

The computing device determines the photographing parameter according to the operation of setting the photographing parameter. For example, the photographing parameter is: the photographing distance is "1", and the photographing angle is "0". It may be understood that, in an application scenario, a distance between the position of the camera and eyes of the target object is "1", and the camera photographs the target object directly facing the eyes of the target object. Namely, in step 202, the computing device may perform photographing preview display according to the operation of setting the photographing parameter by the user, to determine the photographing parameter after the user confirms the set photographing parameter. For example, the user may click the "OK" key to confirm that the current photographing parameter is used as the set photographing parameter.

It should be noted that, step 202 and step 203 are optional steps, and step 202 and step 203 are steps of setting the photographing parameter. After setting of the photographing parameter is completed, step 202 and step 203 may be omitted, and step 204 is directly performed.

Step 204: The computing device obtains first position information and first rotation information of the display device.

The computing device may obtain data of the display device in real time in an interface used for obtaining the direction of the display device. The data includes first position information (denoted as $P_{hmd}$) and first rotation information (denoted as $R_{hmd}$) of the display device in a world coordinate system of a three-dimensional space. It should be noted that the first rotation information may be in a matrix form, or in an Euler angle form, or in a quaternion form. In this embodiment of this application, description is made by using an example in which the first rotation information is in a matrix form.

Step 205: The computing device calculates second position information of the camera according to the first position information and the photographing parameter.

The computing device calculates third position information of the camera in the world coordinate system according to the first position information and a target distance. Namely, the target distance is a distance that is between the camera and the target object displayed in the display device and that is in the photographing parameter, namely, the photographing distance. Then the computing device may convert the third position information into the second position information in the target coordinate system.

In this embodiment of this application, in a same coordinate system (the world coordinate system), the computing device calculates the third position information of the camera in the world coordinate system according to the first position information and the target distance. Understanding is performed with reference to FIG. 8. For example, the coordinate of the first position information is (0, 1, 0), and the third position information of the camera in the world coordinate system is calculated according to the first position information and the target distance (for example, "1"), and the third position information is a coordinate (0, 1, 1). Then the computing device converts the third position information into the second position information in the target coordinate system according to the third position information and an origin $P_{ci}$.

Specifically, through the foregoing steps, the computing device determines the position $P_{hmd}$ of the target object and a target distance (denoted as "D") between the camera and the target object, then, in the world coordinate system, the target object rotates around the y axis by an Euler angle $E(y)$, and a component of the target distance D on the y axis is 0, a component on the x axis is $D*\sin E(y)$, and a component on the z axis is $D*\cos E(y)$. Description is made by using an example in which a value of an angle by which the target object rotates around the y axis in an anticlockwise manner is a positive value in the world coordinate system, and then it may be determined that the third position information of the camera is:

$$P_c=(x-D*\sin E(y),y,z-D*\cos E(y)) P_c=(x-D*\sin E(y), y,z-D*\cos E(y)),$$

where (x, y, z) is the coordinate of the position $P_{hmd}$ of the display device in the VR system.

There are two coordinate systems in the VR system. One is the world coordinate system, and the other is the target coordinate system. The position of the camera needed to calculate the real-time direction of the camera is the position in the target coordinate system. Therefore, the position $P_c$ of the camera in the world coordinate system needs to be converted into the position $P'_c$ in the target coordinate system. Namely, the third position information of the camera in the world coordinate system is converted into the second position information of the camera in the target coordinate system.

In the world coordinate system, a vector of $P_c$ relative to the position of the origin of the target coordinate system is $P_c-P_{ci}$, and then the vector only needs to be converted into a vector in the target coordinate system. Rotation of the target coordinate system relative to the world coordinate system is $E_{ci}$. The computing device may then perform coordinate system conversion on the vector $P_c-P_{ci}$ by means of a quaternion according to an Euler angle to quaternion conversion formula, $E_{ci}$ being represented by $Q_{ci}$. The quaternion form of $E_{ci}$ may be represented by $Q_{ci}$. In the target coordinate system, the vector $P_c-P_{ci}$ may be rotated by $Q_{ci}^* \cdot Q_{ci}$ is conjugate of $Q_{ci}$, and the meaning is reverse rotation of $Q_{ci}$. The computing device may expand the vector into a quaternion form, namely, $Q_{c-ci}=(0, P_c-P_{ci})$, where w is set to 0, so that the value after rotation is obtained as $Q'_{c-ci}=Q_{ci}^*Q_{c-ci}Q_{ci}$, according to a Grassmann product of the quaternion. The value after the rotation may be represented in a form of $Q'_{c-ci}=x'i+y'j+z'k$, (x', y', z') being the position $P'_c$ in the target coordinate system. In this embodiment of this application, conversion is performed on the position in different coordinate systems in a quaternion form. The calculation is convenient, and the calculation amount is small.

It should be noted that, for position conversion in different coordinate systems, in this embodiment of this application, coordinate system conversion is performed on the vector $P_c-P_{ci}$ by means of a quaternion, to obtain $P'_c$, and this is merely an example listed to facilitate description, and does not cause limitative description to this application.

In this embodiment, for example, the position of the camera is horizontal view selfie, and examples of top view or bottom view photographing may be understood according to the horizontal view exemplified in this embodiment. The difference lies in that the calculated components of the selfie distance D on various axes of the world coordinate system are different from this embodiment of this application, but the calculation principles are the same. Refer to the example in this embodiment of this application for understanding.

Step 206: The computing device calculates second rotation information of the camera according to the first rotation information.

The computing device calculates the third rotation information of the camera in the world coordinate system according to the first rotation information, and converts the third rotation information into the second rotation information in the target coordinate system. Specifically, when performing coordinate system conversion on the third rotation information, the computing device may convert the third rotation information into the second rotation information in the target coordinate system according to the third rotation information and $E_{ci}$.

It should be noted that the second rotation information is in a matrix form, and the second rotation information needed to calculate the direction of the camera may not be in a matrix form. For example, the second rotation information input to calculate the direction of the camera may be in a quaternion form.

In a possible implementation, the computing device calculates the second rotation information in a matrix form of the camera according to the first rotation information in a matrix form; and then converts the second rotation information in a matrix form into the second rotation information in a quaternion form.

An example in which the second rotation information in a matrix form is converted into second rotation information in a quaternion form is as follows:

In a three-dimensional space, for the rotation sequence and the right-handed coordinate system involved in rotation, in this embodiment, the right-handed coordinate system may be used. Namely, +x represents rightward, +y represents upward, and +z represents facing the front of an observer.

First, for a point P(x, y, z) in a three-dimensional space, rotating the point around the y axis by an angle β may be represented by using a rotation matrix as follows:

$$R_y(\beta) = \begin{bmatrix} \cos\beta & 0 & \sin\beta \\ 0 & 1 & 0 \\ -\sin\beta & 0 & \cos\beta \end{bmatrix}$$

Similarly, a matrix of rotating around the x coordinate axis by an angle α may be represented as follows:

$$R_x(\alpha) = \begin{bmatrix} 1 & 0 & 1 \\ 0 & \cos\alpha & -\sin\alpha \\ 0 & \sin\alpha & \cos\alpha \end{bmatrix}$$

A matrix of rotating around the z coordinate axis by an angle θ may be represented as follows:

$$R_z(\theta) = \begin{bmatrix} \cos\theta & -\sin\theta & 0 \\ \sin\theta & \cos\theta & 0 \\ 0 & 0 & 1 \end{bmatrix}$$

It should be noted that in actual application, for a point P(x, y, z) in space, angles by which the point rotates around the x, y, and z axes may be the same or may be different. The rotation angles in this embodiment are merely examples listed for facilitating description, and do not cause limitative description to this application.

The time sequence of rotating around the coordinate axes affects the result of the rotation matrix. Namely, a different time sequence of rotating around the coordinate axes may result in a different rotation matrix obtained. For example, in this embodiment of this application, the used sequence is first rotating around the y axis, then rotating around the z axis, and finally rotating around the x axis, and the target coordinate system is a reference coordinate system, and the rotation matrix R is shown in the following formula 1:

$$R = R_y * R_z * R_x = \begin{bmatrix} \cos\beta & 0 & \sin\beta \\ 0 & 1 & 0 \\ -\sin\beta & 0 & \cos\beta \end{bmatrix} *$$

$$\begin{bmatrix} \cos\theta & -\sin\theta & 0 \\ \sin\theta & \cos\theta & 0 \\ 0 & 0 & 1 \end{bmatrix} * \begin{bmatrix} 1 & 0 & 0 \\ 0 & \cos\alpha & -\sin\alpha \\ 0 & \sin\alpha & \cos\alpha \end{bmatrix} =$$

$$\begin{bmatrix} \cos\beta*\cos\theta & -\cos\beta*\sin\theta*\cos\alpha + \sin\beta*\sin\alpha & \cos\beta*\sin\theta*\sin\alpha + \sin\beta*\cos\alpha \\ \sin\theta & \cos\theta*\cos\alpha & -\cos\theta*\sin\alpha \\ -\sin\beta*\cos\theta & \sin\beta*\sin\theta*\cos\beta + \cos\beta*\sin\alpha & -\sin\beta*\sin\theta*\sin\alpha + \cos\beta*\cos\alpha \end{bmatrix}$$

It should be noted that, in this embodiment, the sequence of rotating around the x, y, and z axes are merely examples, and does not cause limitative description to this application.

When the rotation matrix R in the formula 1 is known, a process of converting the rotation matrix into a quaternion form may be:

According to the Euler theorem, any displacement of a rigid body around a fixed point can be obtained by rotating, by an angle, an axis passing through the point. Then a formula 2 in a super plural form of the corresponding quaternion is as follows:

$$Q = \cos\left(\frac{\sigma}{2}\right) + \sin\left(\frac{\sigma}{2}\right)n$$

The following formula 3 is indicated by four units of arities, namely, by a quaternion:

$$Q = q_0 + q_1 i + q_2 j + q_3 k$$

The matrix in the formula 1 may be converted into a quaternion by using the formula 2 and a trigonometric changing formula. A conversion formula 4 is as follows:

$$R = \begin{bmatrix} q_0^2 + q_1^2 - q_2^2 - q_3^2 & 2(q_1 q_2 + q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 + q_0 q_1) \\ 2(q_1 q_3 + q_0 q_2) & 2(q_2 q_3 + q_0 q_1) & q_0^2 - q_1^2 - q_2^2 + q_3^2 \end{bmatrix}$$

In another implementation, the computing device converts the second rotation information in a matrix form into the second rotation information in an Euler angle form; and then converts the second rotation information in an Euler angle form into the second rotation information in a quaternion form.

In this embodiment of this application, the achieved photographing effect may be a photographing effect corresponding to a photographing angle in which the camera has the same height as the target object and horizontally looks at the target object, or the camera looks down or looks up the target object, and the photographing effect is similar to a free selfie effect of a selfie stick in the real world. To facilitate description, in this embodiment of this application, a horizontal view selfie effect is used as an example. In this photographing mode, the camera does not rotate around the x axis and the z axis, namely, the rotation angle around the x axis is 0, and the rotation angle around the z axis is also 0. The y axis is opposite to the rotation angle of the target object, namely, an angle between the target object and the y axis is 180 degrees.

The rotation matrix of the target object is known according to the formula 1, and an Euler angle of rotation thereof can be obtained according to information about the rotation matrix. Assuming that the rotation matrix is $R=[m_{i,j}]_{m \times n}$, m is the number of rows in the rotation matrix R, n is the number of columns in the rotation matrix, $m_{i,j}$ is a value of an ith row and a jth column, then the Euler angle of the y axis of the target object is:

$$E(y) = \begin{cases} a\tan2(-m_{z,0}, m_{0,0}) & (m_{1,0}! = 1 \text{ or } -1) \\ a\tan2(m_{0,2}, m_{2,2}) & (m_{1,0} = 1 \text{ or } -1) \end{cases}$$

E(y) is the rotation angle of the world coordinate system, and in the target coordinate system, the rotation angle E'(y) of the camera is:

$$E'(y)=E(y)_{-E_{ci}(y)+\pi}$$

The Euler angle and the quaternion indication methods are both common methods that indicate rotation. The Euler angle indication method has advantages such as brevity and apparent geometrical meanings, and moreover, an attitude sensor (such as a head-mounted display) can directly detect the parameters, and can solve the attitude conveniently. In this embodiment of this application, conversion of the matrix into the Euler angle also facilitates user understanding. It is convenient to set a photographing parameter by means of Euler angle descriptions. However, operation of the Euler angle needs trigonometric operation for a plurality of times. If the quaternion form is used, the operation is relatively convenient. The receiving parameter of rotation of the camera is set to a quaternion. Therefore, the second rotation information in the Euler angle form further needs to be converted into the second rotation information in the quaternion form, and the OpenVR right-handed coordinate system quaternion $Q'_c=q_0'+q_1'i+q_2'j+q_3'k$ is still used.

Then, $$\begin{cases} q_0' = \cos\frac{\beta}{2}*\cos\frac{\theta}{2}*\cos\frac{\alpha}{2} - \sin\frac{\beta}{2}*\sin\frac{\theta}{2}*\sin\frac{\alpha}{2} \\ q_0' = \cos\frac{\beta}{2}*\cos\frac{\theta}{2}*\sin\frac{\alpha}{2} + \sin\frac{\beta}{2}*\sin\frac{\theta}{2}*\cos\frac{\alpha}{2} \\ q_2' = \sin\frac{\beta}{2}*\cos\frac{\theta}{2}*\cos\frac{\alpha}{2} + \cos\frac{\beta}{2}*\sin\frac{\theta}{2}*\sin\frac{\alpha}{2} \\ q_3' = \cos\frac{\beta}{2}*\sin\frac{\theta}{2}*\cos\frac{\alpha}{2} - \sin\frac{\beta}{2}*\cos\frac{\theta}{2}*\sin\frac{\alpha}{2} \end{cases}$$

and α, β, and θ on the right side of the equation are Euler angles.

In this example, x=z=0, y=E'(y), and therefore $Q'_c=$ $$\left(\cos\frac{E'(y)}{2}, 0, \sin\frac{E'(y)}{2}, 0\right).$$

In this way, the second rotation information ($Q'_c$) in a quaternion form may be determined.

It should be noted that step 205 and step 206 are not limited in time sequence, step 206 may also be performed before step 205, and step 205 and step 206 may also be performed simultaneously.

Step 207: The computing device calculates a real-time direction of the camera according to the second position information and the second rotation information.

Figure 10:
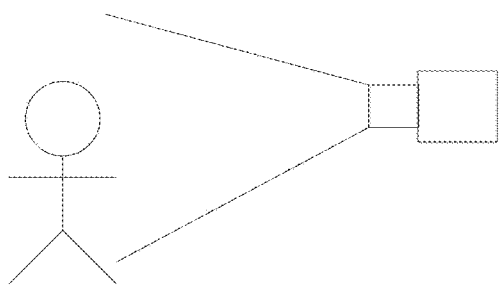
FIG. 10 is a schematic diagram of a scene in which a real-time direction of a camera is determined in an embodiment of this application.

Understanding is performed with reference to FIG. 10. FIG. 10 is a schematic diagram of a scene in which a real-time direction of a camera is determined. When determining the second position information and the second rotation information of the camera, the computing device determines the photographing angle of the camera.

Step 208: The computing device records, according to the real-time direction of the camera, image information photographed by the camera.

In this embodiment of this application, the computing device obtains the first position information and the first rotation information of the display device, and then may calculate the second position information of the camera according to the first position information and the photographing parameter, and the computing device calculates the second rotation information of the camera according to the first rotation information; after the second position information and the second rotation information are determined, the real-time direction of the camera may be further determined, and the image information photographed by the camera is recorded according to the real-time direction of the camera. In this embodiment of this application, one virtual controller is created through the OpenVR driver interface, and the virtual controller represents one camera in a VR application. The second position information and the second rotation information of the camera are calculated according to the first position information and the first rotation information of the display device that are obtained in real time, and the photographing parameter set by a user, and the real-time direction of the camera is determined, to record photographed information. The method provided in this embodiment may make up for a selfie function loss for a VR application without a selfie function, and the method may also be used as a functional supplement for a VR application with a selfie function, and provides a photographing manner that does not affect normal use of a VR application by a user.

Figure 11:
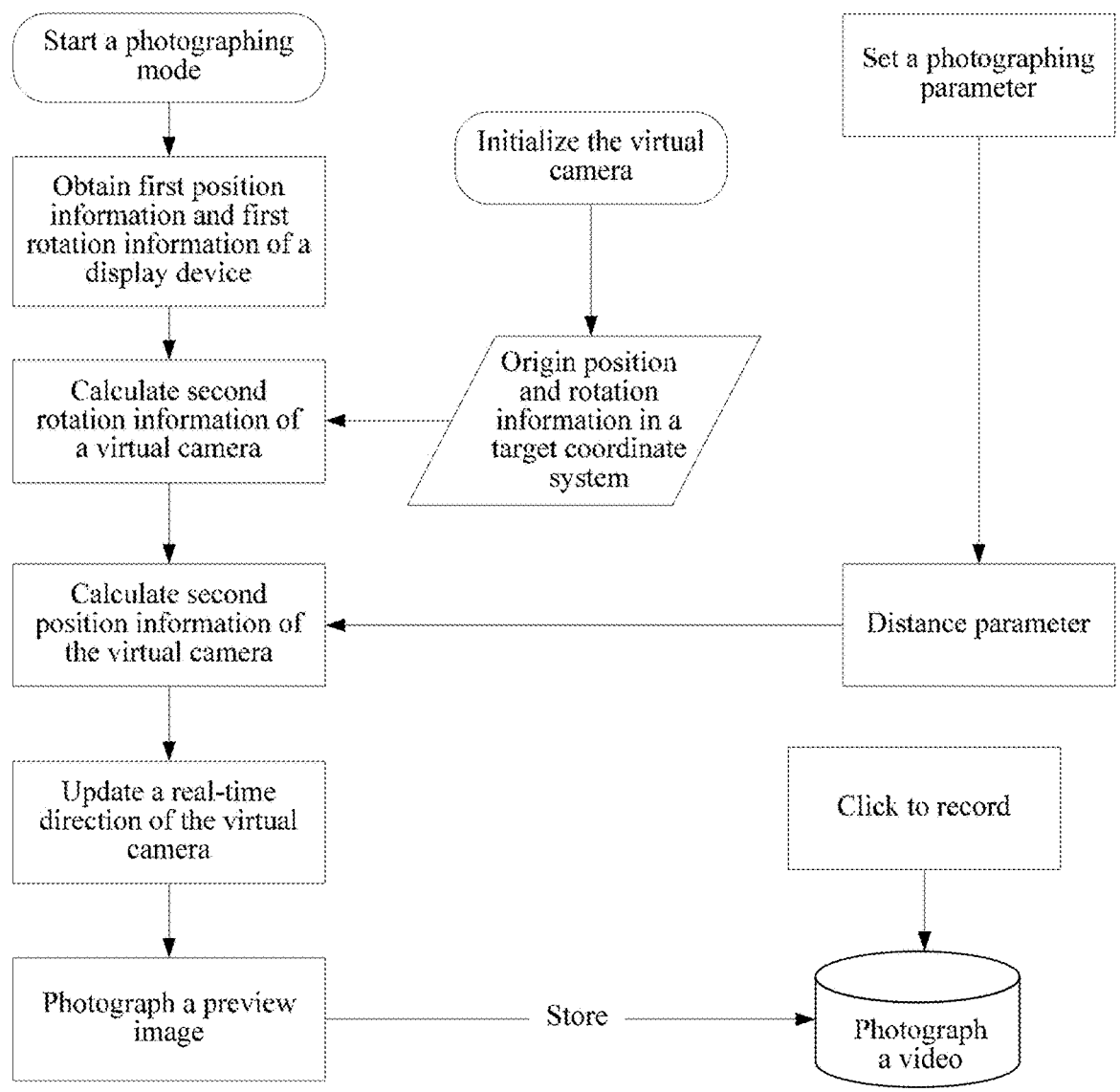
FIG. 11 is a schematic scene flowchart of steps of a method for implementing photographing in VR in an embodiment of this application.

To facilitate understanding, the following describes a method provided in this embodiment of this application by using a scene example. Understanding is performed with reference to FIG. 11. FIG. 11 is a schematic scene flowchart of steps of a method for implementing photographing in VR.

In a scene, a user plays a car racing game by using a VR application, and wants to record the situation of the entire game and share it to friends. Before photographing, the user may set a photographing parameter through a UI interface displayed by the computing device. The photographing parameter includes a distance parameter D and a photographing angle. The distance parameter D is the photographing distance.

A selfie mode is started.

The computing device creates a camera, and then obtains an origin position P and a rotation parameter Q during initialization of the camera.

A user wears a head-mounted display device. The user clicks "record" on the UI interface. The head-mounted display device can detect, in real time, a position change of the head-mounted display device in a real environment. Correspondingly, the computing device obtains real-time first position information and first rotation information of a head of a racer (the target object of the user in VR). The computing device calculates second rotation information of the camera according to the first rotation information, the origin position P, and the rotation parameter, and calculates second position information of the computer according to the first position information and the photographing parameter that is set by the user. The computing device constantly updates the real-time direction of the camera in real time. A photographing image can be previewed in real time through a display of the computing device, and the photographing image is recorded. In a process of recording the photographing image, a game process of the user is not interrupted.

Figure 12:
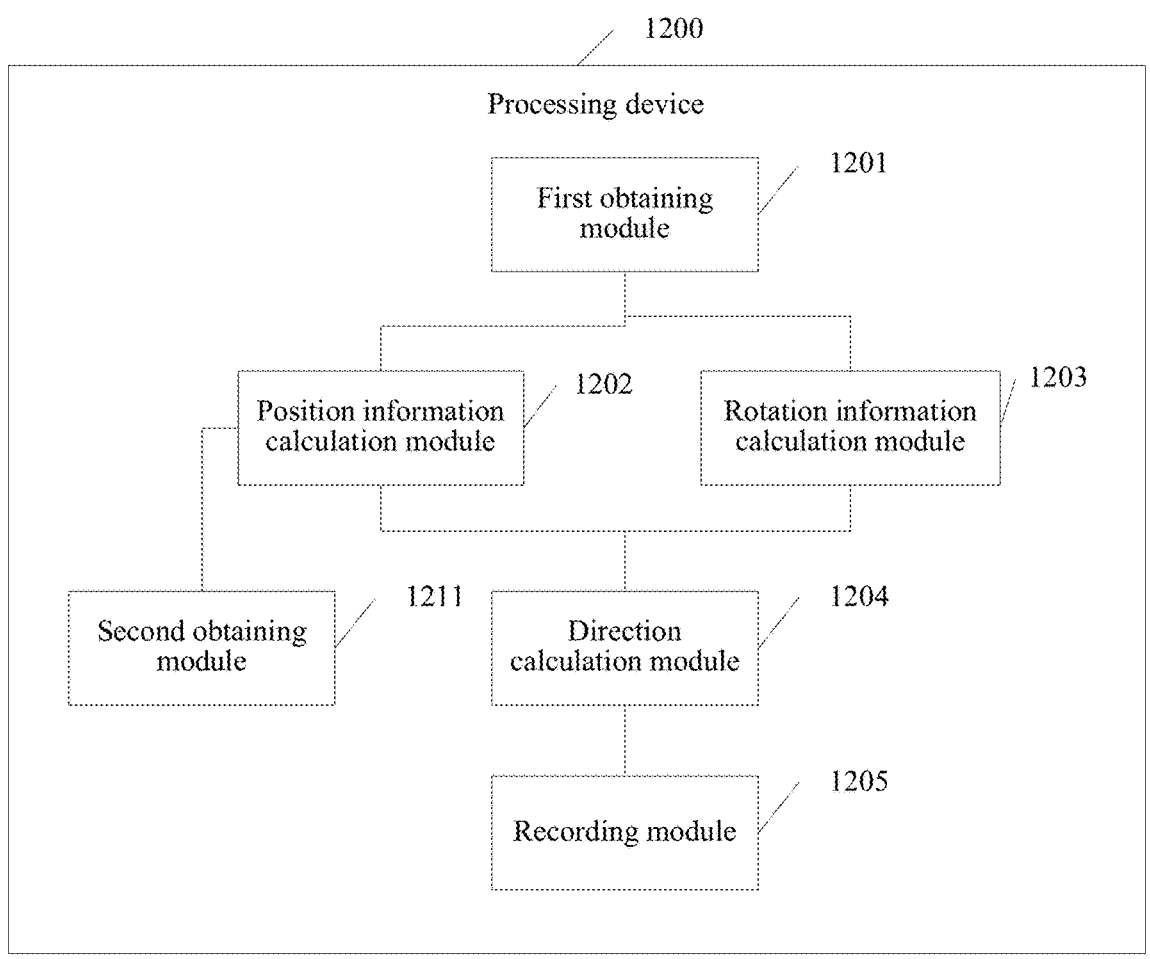
FIG. 12 is a schematic structural diagram of an embodiment of a computing device in an embodiment of this application.

A method for implementing photographing in VR provided in the embodiments of this application is described above, and the following describes a computing device to which the method in the embodiments of this application is applied. Referring to FIG. 12, an embodiment of this application provides an embodiment of a computing device 1200, including:

The computing device is applied to a VR system including a computing device and a VR display device, and the computing device includes:

a first obtaining module 1201, configured to obtain first position information and first rotation information of the display device;

a second obtaining module 1211, configured to obtain a photographing parameter, the photographing parameter including a distance between a virtual camera and a target object displayed in the display device, the virtual camera being a created virtual controller;

a position information calculation module 1202, configured to calculate second position information of the camera according to the first position information obtained by the first obtaining module 1201 and the photographing parameter obtained by the second obtaining module 1211;

a rotation information calculation module 1203, configured to calculate second rotation information of the camera according to the first rotation information obtained by the obtaining module 1201;

a direction calculation module 1204, configured to calculate a real-time direction of the camera according to the second position information calculated by the position information calculation module 1202 and the second rotation information calculated by the rotation information calculation module 1203; and a recording module 1205, configured to record, according to the real-time direction of the camera that is calculated by the direction calculation module 1204, image information photographed by the camera.

Figure 13:
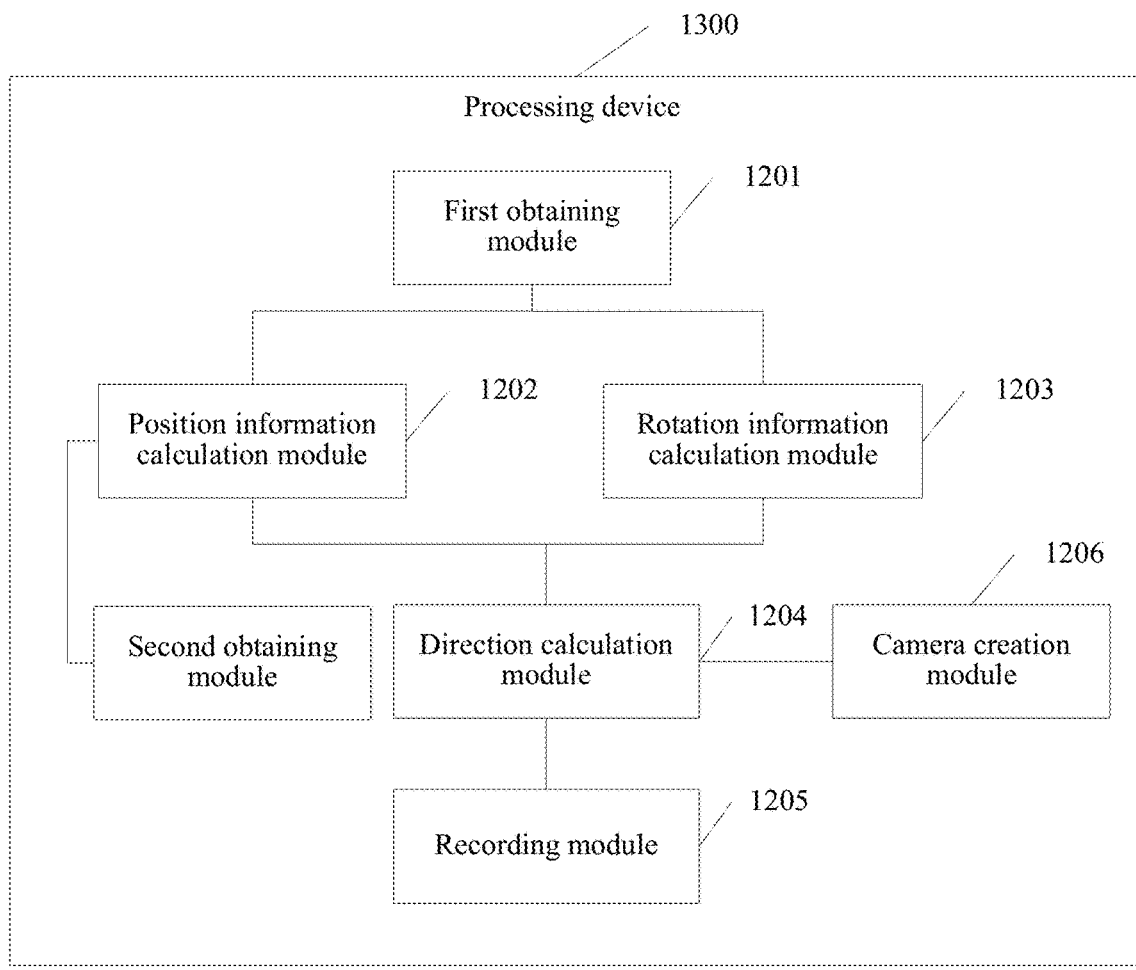
FIG. 13 is a schematic structural diagram of another embodiment of a computing device in an embodiment of this application.

Based on FIG. 12, understanding is performed in combination with FIG. 13. An embodiment of this application provides an embodiment of a computing device 1300, including: further including a camera creation module 1206, the camera creation module 1206 being configured to create the virtual controller through a driver interface, the virtual controller being configured to execute a function of the camera.

Figure 14:
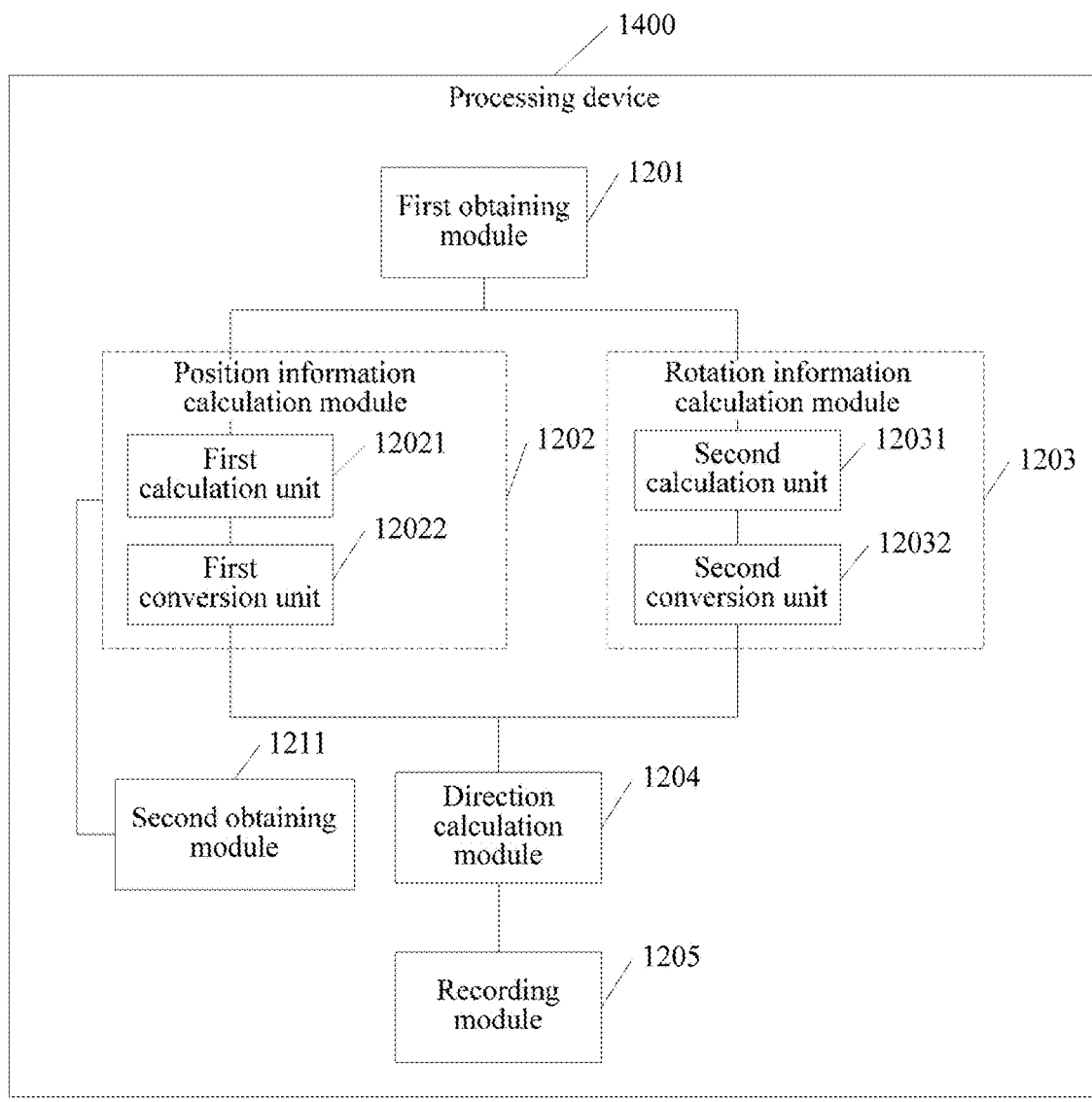
FIG. 14 is a schematic structural diagram of another embodiment of a computing device in an embodiment of this application.

Based on FIG. 12, understanding is performed in combination with FIG. 14. An embodiment of this application provides an embodiment of a computing device 1400, including:

the first position information and the first rotation information being information in a world coordinate system, the position information calculation module 1202 including a first calculation unit 12021 and a first conversion unit 12022, and the rotation information calculation module 1203 including a second calculation unit 12031 and a second conversion unit 12032, the first calculation unit 12021 being configured to calculate third position information of the camera in the world coordinate system according to the first position information and the photographing parameter;

the first conversion unit 12022 being configured to convert the third position information calculated by the first calculation unit 12021 into the second position information in a target coordinate system;

the second calculation unit 12031 being configured to calculate third rotation information of the camera in the world coordinate system according to the first rotation information; and the second conversion unit 12032 being configured to convert the third rotation information calculated by the second calculation unit 12031 into the second rotation information in a target coordinate system.

Figure 15:
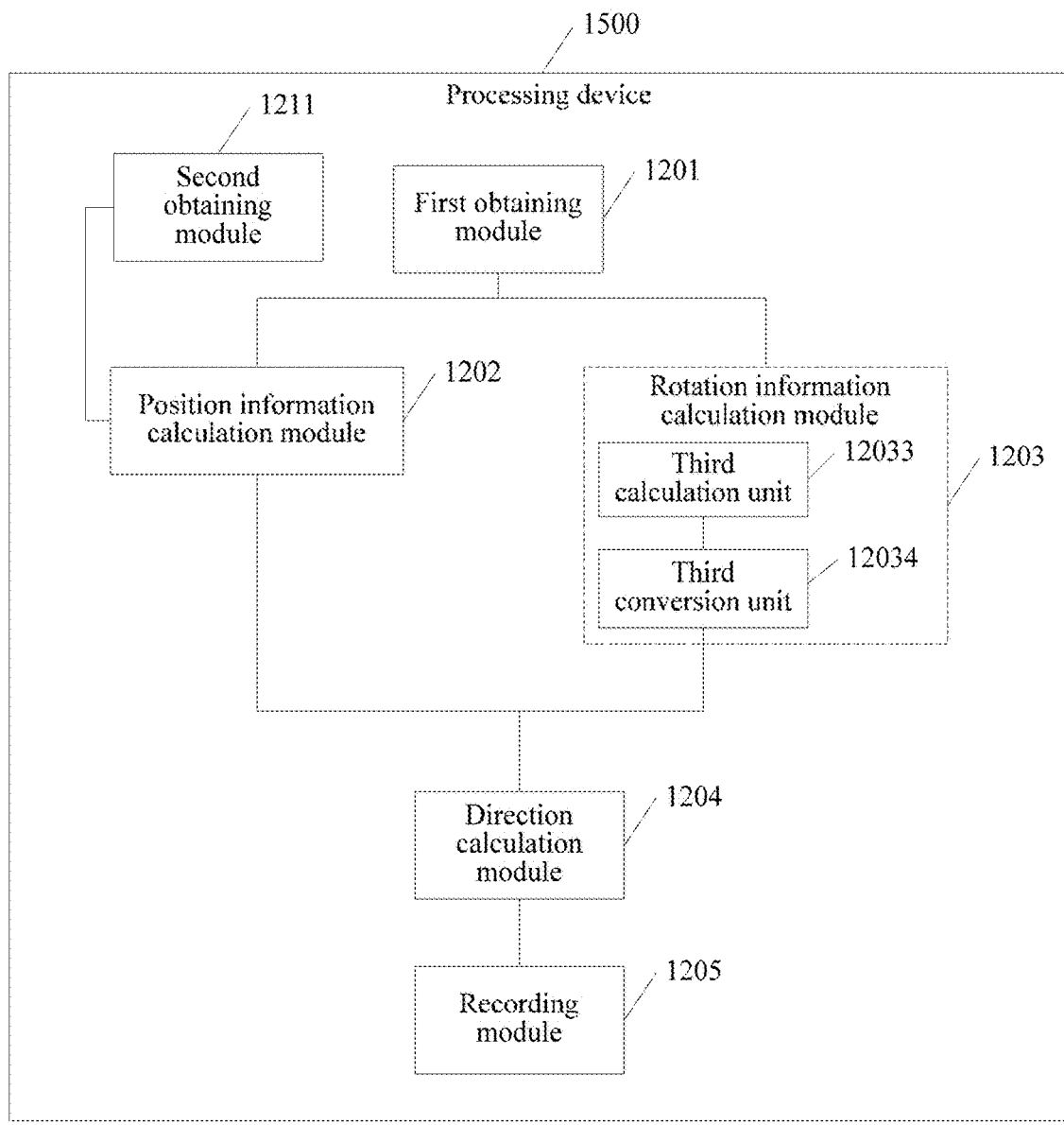
FIG. 15 is a schematic structural diagram of another embodiment of a computing device in an embodiment of this application.

Based on FIG. 12, understanding is performed in combination with FIG. 15. An embodiment of this application provides an embodiment of a computing device 1500, including:

the rotation information calculation module 1203 including a third calculation unit 12033 and a third conversion unit 12034, the third calculation unit 12033 being configured to calculate the second rotation information in a matrix form according to the first rotation information in a matrix form; and the third conversion unit 12034 being configured to convert the second rotation information in a matrix form that is calculated by the third calculation unit 12033 into the second rotation information in a quaternion form.

Optionally, the third conversion unit 12034 is further configured to: convert the second rotation information in a matrix form into the second rotation information in an Euler angle form; and convert the second rotation information in an Euler angle form into the second rotation information in a quaternion form.

Figure 16:
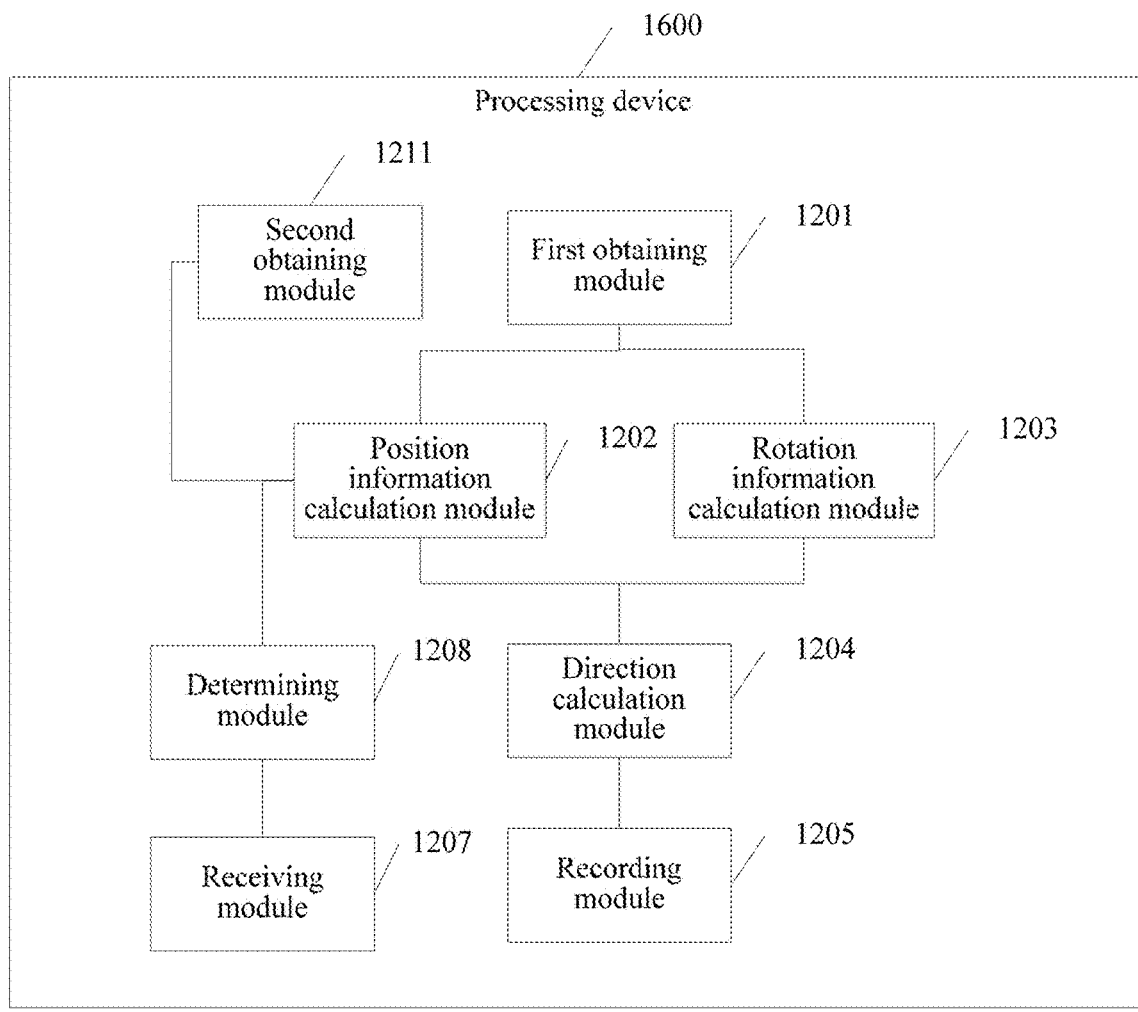
FIG. 16 is a schematic structural diagram of another embodiment of a computing device in an embodiment of this application.

Based on FIG. 12, understanding is performed in combination with FIG. 16. An embodiment of this application provides an embodiment of a computing device 1600, including:

further including a receiving module 1207 and a determining module 1208, the receiving module 1207 being configured to receive an operation of setting the photographing parameter; and the determining module 1208 being configured to determine the photographing parameter according to the operation of setting the photographing parameter that is received by the receiving module 1207.

Further, the computing device in FIG. 12 to FIG. 16 is presented in a form of a functional module. The "module" herein may refer to an application-specific integrated circuit (ASIC), a circuit, a processor for executing one or more software or firmware programs, a memory, an integrated logic circuit, and/or another device that can provide the foregoing functions. In a simple embodiment, the computing device in FIG. 12 to FIG. 16 may use the form shown in FIG. 17.

Figure 17:
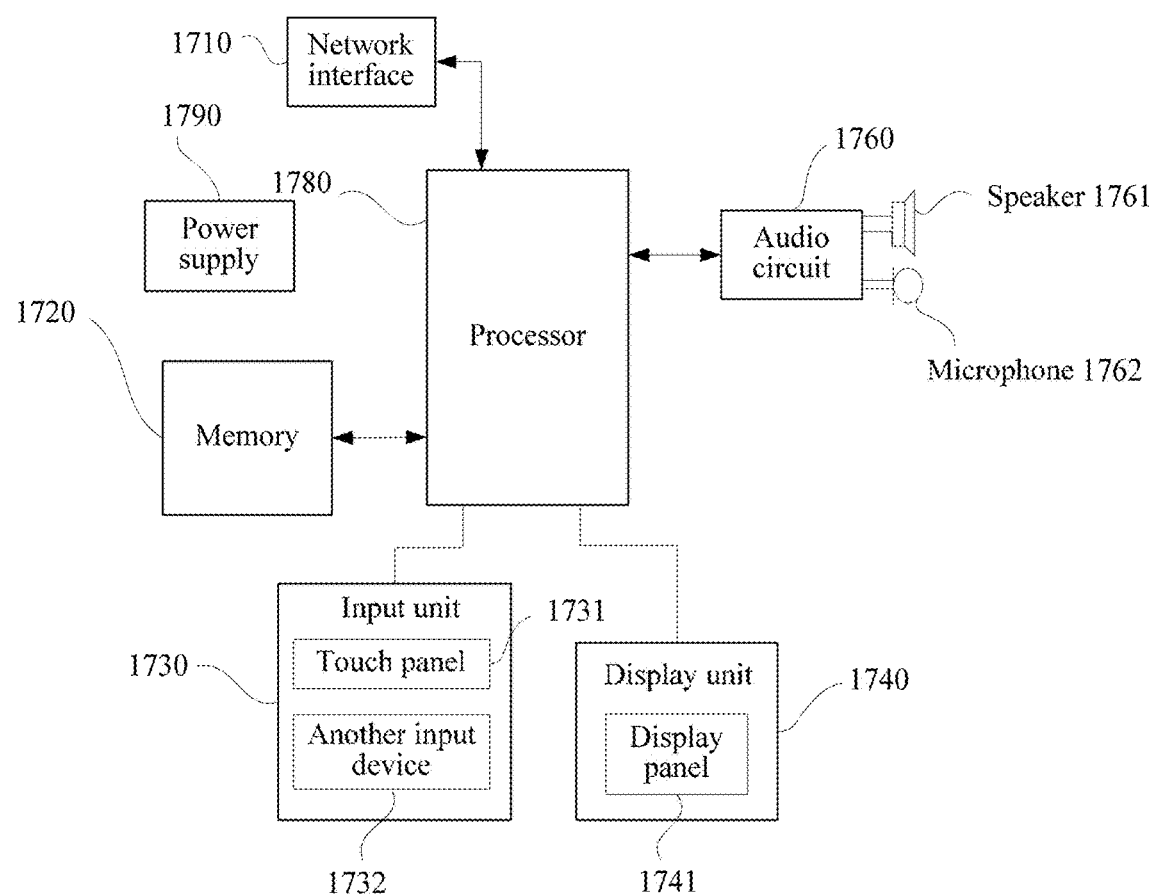
FIG. 17 is a schematic structural diagram of another embodiment of a computing device in an embodiment of this application.

An embodiment of this application further provides another computing device. As shown in FIG. 17, for ease of description, only parts related to the embodiments of this application are shown. For specific technical details that are not disclosed, refer to the method part of the embodiments of this application. The computing device may be a computer, a tablet computer, a mobile phone, or the like. For example, the computing device is a computer.

FIG. 17 is a block diagram of a partial structure of a computing device related to a computing device according to an embodiment of this application. Referring to FIG. 17, the computing device includes components such as a network interface 1710, a memory 1720, an input unit 1730, a display unit 1740, an audio circuit 1760, a processor 1780, and a power supply 1790. A person skilled in the art may understand that the structure of the computing device shown in FIG. 17 does not constitute a limitation to the computing device, and the computing device may include more components or fewer components than those shown in the figure, or some components may be combined, or a different component deployment may be used.

Each component part of the computing device is described below in detail with reference to FIG. 17.

The network interface 1710 is a wireless or wired network interface, configured to receive data sent by a head-mounted display device, and further configured to send data to the head-mounted display device.

The memory 1720 may be configured to store a software program and module. The processor 1780 runs the software program and module stored in the memory 1720, to implement various functional applications and data processing of the computing device. The memory 1720 may mainly include a program storage area and a data storage area. The program storage area may store an operating system, an application program required by at least one function (such as a sound playing function and an image display function), and the like. In addition, the memory 1720 may include a high-speed random access memory, or may also include a non-volatile memory such as at least one disk storage device, flash storage device, or another non-volatile solid-state storage device.

The input unit 1730 may be configured to: receive input digit or character information, and generate a key signal input related to the user setting and function control of the computing device. Specifically, the input unit 1730 may include a touch panel 1731 and another input device 1732. The touch panel 1731 may also be referred to as a touchscreen, and may collect a touch operation of a user on or near the touch panel (such as an operation of a user on or near the touch panel 1731 by using any suitable object or attachment, such as a finger or a stylus), and drive a corresponding connection apparatus according to a preset program. Optionally, the touch panel 1731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1780. Moreover, the touch controller can receive and execute a command sent from the processor 1780. In addition, the touch panel 1731 may be a resistive, capacitive, infrared, or surface sound wave type touch panel. In addition to the touch panel 1731, the input unit 1730 may further include the another input device 1732. Specifically, the another input device 1732 may include, but is not limited to, one or more of a physical keyboard, a functional key (such as a volume control key or a switch key), a track ball, a mouse, and a joystick.

The display unit 1740 may be configured to display information input by the user or information provided for the user, and various menus of the computing device. The display unit 1740 may include a display panel 1741. Optionally, the display panel 1741 may be configured by using a liquid crystal display (LCD), an organic light-emitting diode (OLED), or the like. Further, the touch panel 1731 may cover the display panel 1741. After detecting a touch operation on or near the touch panel 1731, the touch panel 1731 transfers the touch operation to the processor 1780, to determine a type of a touch event. Then, the processor 1780 provides a corresponding visual output on the display panel 1741 according to the type of the touch event. Although, in FIG. 17, the touch panel 1731 and the display panel 1741 are used as two separate parts to implement input and output functions of the computing device, in some embodiments, the touch panel 1731 and the display panel 1741 may be integrated to implement the input and output functions of the computing device.

The audio circuit 1760, a speaker 1761, and a microphone 1762 may provide audio interfaces between the user and the computing device. The audio circuit 1760 may convert received audio data into an electric signal and transmit the electric signal to the speaker 1761. The speaker 1761 converts the electric signal into a sound signal for output. On the other hand, the microphone 1762 converts a collected sound signal into an electric signal. The audio circuit 1760 receives the electric signal and converts the electric signal into audio data, and outputs the audio data to the processor 1780 for processing. Then, the processor 1780 sends the audio data to, for example, another computing device by using the RF circuit 1710, or outputs the audio data to the memory 1720 for further processing.

The processor 1780 is a control center of the computing device, and connects to various parts of the entire computing device by using various interfaces and lines. By running or executing the software program and/or module stored in the memory 1720, and invoking data stored in the memory 1720, the processor 1780 performs various functions and data processing of the computing device, thereby performing overall monitoring on the computing device. Optionally, the processor 1780 may include one or more processing units. Preferably, the processor 1780 may integrate an application processor and a modem processor. The application processor mainly processes an operating system, a user interface, an application program, and the like. The modem processor mainly processes wireless communication. It may be understood that the foregoing modem may not be integrated into the processor 1780, either.

The computing device further includes the power supply 1790 (such as a battery) for supplying power to the components. Preferably, the power supply may be logically connected to the processor 1780 by using a power management system, thereby implementing functions such as charging, discharging, and power consumption management by using the power management system.

Although not shown in the figure, the computing device may further include a camera, a Bluetooth module, and the like, which are not described herein again.

In this embodiment of this application, the processor 1780 included in the computing device is further configured to perform method steps in the method embodiment. Details are as follows:

The processor 1780 is configured to: obtain first position information and first rotation information of the display device; calculate second position information of the camera according to the first position information and the photographing parameter, and calculate second rotation information of the camera according to the first rotation information, the camera being a virtual controller created through a driver interface, and the photographing parameter including a distance between the camera and a target object displayed in the display device; calculate a real-time direction of the camera according to the second position information and the second rotation information; and record, according to the real-time direction of the camera, image information photographed by the camera.

Optionally, the processor 1780 is further configured to create the camera through the driver interface.

The first position information and the first rotation information is information in a world coordinate system. The processor 1780 is further configured to: calculate third position information of the camera in the world coordinate system according to the first position information and the photographing parameter, and convert the third position information into the second position information in a target coordinate system;

calculate third rotation information of the camera in the world coordinate system according to the first rotation information, and convert the third rotation information into the second rotation information in a target coordinate system.

Optionally, the processor 1780 is further configured to: calculate the second rotation information in a matrix form of the camera according to the first rotation information in a matrix form; and convert the second rotation information in a matrix form into the second rotation information in a quaternion form.

Optionally, the processor 1780 is further configured to: convert the second rotation information in a matrix form into the second rotation information in an Euler angle form; and convert the second rotation information in an Euler angle form into the second rotation information in a quaternion form.

The network interface 1710 is configured to receive an operation of setting the photographing parameter.

The processor 1780 is further configured to determine the photographing parameter according to the operation of setting the photographing parameter.

An embodiment of this application provides a computer readable storage medium, the computer readable storage medium storing an instruction, and when run on a computer, the instruction causing the computer to perform the method shown in the method embodiment.

It may be clearly understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated units may be implemented in a form of hardware or may be implemented in a form of a software functional unit.

If the integrated unit is implemented in a form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash memory drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for photographing VR content, applied to a virtual reality (VR) system, the VR system comprising a computing device and a VR display device, the VR display device being connected to the computing device, and the method comprising:

obtaining, by the computing device, first position information and first rotation information of the VR display device;

obtaining, by the computing device, a photographing parameter, the photographing parameter comprising a distance between a virtual camera and a target object displayed in the display device, wherein the target object is a virtual role of a user wearing the VR display device in a virtual world created by the VR system; and the virtual camera is a created virtual controller;

detecting a real-time position change of the VR display device;

updating the first position information and the first rotation information of the VR display device in accordance with the real-time position change of the VR display device;

calculating, by the computing device, second position information of the virtual camera according to the first position information and the photographing parameter;

calculating, by the computing device, second rotation information of the virtual camera according to the first rotation information;

calculating, by the computing device, a real-time direction of the virtual camera according to the second position information and the second rotation information; and recording, by the computing device according to the real-time direction of the virtual camera, image information including the target object photographed by the virtual camera.

2. The method for photographing VR content according to claim 1, the method further comprising:
before calculating, by the computing device, second position information of the virtual camera according to the first position information and the photographing parameter:
creating, by the computing device, the virtual controller through a driver interface, the virtual controller being configured to execute a function of the virtual camera.

3. The method for photographing VR content according to claim 1, wherein the first position information is information in a world coordinate system, and the calculating, by the computing device, second position information of the virtual camera according to the first position information and the photographing parameter comprises:
calculating, by the computing device, third position information of the virtual camera in the world coordinate system according to the first position information and the photographing parameter; and
converting, by the computing device, the third position information into the second position information in a target coordinate system.

4. The method for photographing VR content according to claim 1, wherein the first rotation information is information in a world coordinate system, and the calculating, by the computing device, second rotation information of the virtual camera according to the first rotation information comprises:
calculating, by the computing device, third rotation information of the virtual camera in the world coordinate system according to the first rotation information; and
converting, by the computing device, the third rotation information into the second rotation information in a target coordinate system.

5. The method for photographing VR content according to claim 1, wherein the calculating, by the computing device, second rotation information of the virtual camera according to the first rotation information comprises:
calculating, by the computing device, the second rotation information in a matrix form of the virtual camera according to the first rotation information in a matrix form; and
converting, by the computing device, the second rotation information in a matrix form into the second rotation information in a quaternion form.

6. The method for photographing VR content according to claim 5, wherein the converting, by the computing device, the second rotation information in a matrix form into the second rotation information in a quaternion form comprises:
converting, by the computing device, the second rotation information in a matrix form into the second rotation information in an Euler angle form; and
converting, by the computing device, the second rotation information in an Euler angle form into the second rotation information in a quaternion form.

7. The method for photographing VR content according to claim 1, the method further comprising:
before calculating, by the computing device, second position information of the virtual camera according to the first position information and the photographing parameter:
receiving, by the computing device, an operation of setting the photographing parameter; and
determining, by the computing device, the photographing parameter according to the operation of setting the photographing parameter.

8. A computing device comprising one or more processors, memory coupled to the one or more processors and a plurality of programs stored in the memory for photographing VR content, applied to a virtual reality (VR) system comprising a VR display device, and wherein the plurality of programs, when executed by the one or more processors, cause the computing device to perform a plurality of operations comprising:
obtaining, by the computing device, first position information and first rotation information of the VR display device;
obtaining, by the computing device, a photographing parameter, the photographing parameter comprising a distance between a virtual camera and a target object displayed in the display device, wherein
the target object is a virtual role of a user wearing the VR display device in a virtual world created by the VR system; and
the virtual camera is a created virtual controller;
detecting a real-time position change of the VR display device;
updating the first position information and the first rotation information of the VR display device in accordance with the real-time position change of the VR display device;
calculating, by the computing device, second position information of the virtual camera according to the first position information and the photographing parameter;
calculating, by the computing device, second rotation information of the virtual camera according to the first rotation information;
calculating, by the computing device, a real-time direction of the virtual camera according to the second position information and the second rotation information; and
recording, by the computing device according to the real-time direction of the virtual camera, image information including the target object photographed by the virtual camera.

9. The computing device according to claim 8, wherein the plurality of operations further comprise:
before calculating, by the computing device, second position information of the virtual camera according to the first position information and the photographing parameter:
creating, by the computing device, the virtual controller through a driver interface, the virtual controller being configured to execute a function of the virtual camera.

10. The computing device according to claim 8, wherein the first position information is information in a world coordinate system, and the calculating, by the computing device, second position information of the virtual camera according to the first position information and the photographing parameter comprises:
calculating, by the computing device, third position information of the virtual camera in the world coordinate system according to the first position information and the photographing parameter; and
converting, by the computing device, the third position information into the second position information in a target coordinate system.

11. The computing device according to claim 8, wherein the first rotation information is information in a world coordinate system, and the calculating, by the computing device, second rotation information of the virtual camera according to the first rotation information comprises:
calculating, by the computing device, third rotation information of the virtual camera in the world coordinate system according to the first rotation information; and
converting, by the computing device, the third rotation information into the second rotation information in a target coordinate system.

12. The computing device according to claim 8, wherein the calculating, by the computing device, second rotation information of the virtual camera according to the first rotation information comprises:
calculating, by the computing device, the second rotation information in a matrix form of the virtual camera according to the first rotation information in a matrix form; and
converting, by the computing device, the second rotation information in a matrix form into the second rotation information in a quaternion form.

13. The computing device according to claim 12, wherein the converting, by the computing device, the second rotation information in a matrix form into the second rotation information in a quaternion form comprises:
converting, by the computing device, the second rotation information in a matrix form into the second rotation information in an Euler angle form; and
converting, by the computing device, the second rotation information in an Euler angle form into the second rotation information in a quaternion form.

14. The computing device according to claim 8, wherein the plurality of operations further comprise:
before calculating, by the computing device, second position information of the virtual camera according to the first position information and the photographing parameter:
receiving, by the computing device, an operation of setting the photographing parameter; and
determining, by the computing device, the photographing parameter according to the operation of setting the photographing parameter.

15. A non-transitory computer readable storage medium storing a plurality of machine readable instructions for photographing VR content in connection with a virtual reality (VR) system comprising a VR display device and a computing device having one or more processors, memory coupled to the one or more processors and a plurality of programs stored in the memory that, when executed by the one or more processors, cause the computing device to perform a plurality of operations including:
obtaining, by the computing device, first position information and first rotation information of the VR display device;
obtaining, by the computing device, a photographing parameter, the photographing parameter comprising a distance between a virtual camera and a target object displayed in the display device, wherein
the target object is a virtual role of a user wearing the VR display device in a virtual world created by the VR system; and
the virtual camera is a created virtual controller;
detecting a real-time position change of the VR display device;
updating the first position information and the first rotation information of the VR display device in accordance with the real-time position change of the VR display device;
calculating, by the computing device, second position information of the virtual camera according to the first position information and the photographing parameter;
calculating, by the computing device, second rotation information of the virtual camera according to the first rotation information;
calculating, by the computing device, a real-time direction of the virtual camera according to the second position information and the second rotation information; and
recording, by the computing device according to the real-time direction of the virtual camera, image information including the target object photographed by the virtual camera.

16. The non-transitory computer readable storage medium according to claim 15, wherein the plurality of operations further comprise:
before calculating, by the computing device, second position information of the virtual camera according to the first position information and the photographing parameter:
creating, by the computing device, the virtual controller through a driver interface, the virtual controller being configured to execute a function of the virtual camera.

17. The non-transitory computer readable storage medium according to claim 15, wherein the first position information is information in a world coordinate system, and the calculating, by the computing device, second position information of the virtual camera according to the first position information and the photographing parameter comprises:
calculating, by the computing device, third position information of the virtual camera in the world coordinate system according to the first position information and the photographing parameter; and
converting, by the computing device, the third position information into the second position information in a target coordinate system.

18. The non-transitory computer readable storage medium according to claim 15, wherein the first rotation information is information in a world coordinate system, and the calculating, by the computing device, second rotation information of the virtual camera according to the first rotation information comprises:
calculating, by the computing device, third rotation information of the virtual camera in the world coordinate system according to the first rotation information; and
converting, by the computing device, the third rotation information into the second rotation information in a target coordinate system.

19. The non-transitory computer readable storage medium according to claim 15, wherein the calculating, by the computing device, second rotation information of the virtual camera according to the first rotation information comprises:
calculating, by the computing device, the second rotation information in a matrix form of the virtual camera according to the first rotation information in a matrix form; and
converting, by the computing device, the second rotation information in a matrix form into the second rotation information in a quaternion form.

20. The non-transitory computer readable storage medium according to claim 15, wherein the plurality of operations further comprise:
before calculating, by the computing device, second position information of the virtual camera according to the first position information and the photographing parameter:

receiving, by the computing device, an operation of setting the photographing parameter; and determining, by the computing device, the photographing parameter according to the operation of setting the photographing parameter.

\* \* \* \* \*